US011496940B2

(12) United States Patent
Bodduru et al.

(10) Patent No.: US 11,496,940 B2
(45) Date of Patent: Nov. 8, 2022

(54) INTER USER INTERFERENCE CONTROL TECHNIQUES

(71) Applicant: QUALCOMM Incorporated, San Diego, CA (US)

(72) Inventors: Appala Naga Raju Bodduru, Hyderabad (IN); Ankit Sharma, Sunnyvale, CA (US); Kihak Yi, Hyderabad (IN); Srikanth K. R., Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 17/125,767

(22) Filed: Dec. 17, 2020

(65) Prior Publication Data
US 2021/0204186 A1 Jul. 1, 2021

Related U.S. Application Data

(60) Provisional application No. 62/953,816, filed on Dec. 26, 2019.

(51) Int. Cl.
*H04W 36/20* (2009.01)
*H04W 36/00* (2009.01)
(Continued)

(52) U.S. Cl.
CPC ........... *H04W 36/20* (2013.01); *H04L 1/0009* (2013.01); *H04W 36/0005* (2013.01); *H04W 72/0466* (2013.01)

(58) Field of Classification Search
CPC ..... H04L 1/0001; H04L 1/0009; H04L 1/001; H04L 1/0011; H04L 1/0013; H04L 1/004; H04L 1/0041; H04L 1/0042; H04L 1/0045; H04L 25/03343; H04L 27/2639; H04L 27/265; H04L 27/26; H04L 5/0005; H04L 5/0007; H04L 5/0014; H04L 5/0016; H04L 5/0023; H04B 7/0613; H04B 7/0617;
(Continued)

(56) References Cited

U.S. PATENT DOCUMENTS

| 2014/0073337 | A1* | 3/2014 | Hong | H04W 16/28 |
| | | | | 455/452.1 |
| 2017/0099092 | A1* | 4/2017 | Kakishima | H04B 7/0469 |
| 2018/0041261 | A1* | 2/2018 | Modarres Razavi | |
| | | | | H04B 7/0656 |

* cited by examiner

*Primary Examiner* — Peter Chen
(74) *Attorney, Agent, or Firm* — Arent Fox LLP/Qualcomm Incorporated

(57) ABSTRACT

Aspects of the present disclosure implement techniques of a new 3D waveform coding scheme that leverages the spatial properties of 5G NR systems. Specifically, in 5G systems, each UE location may be characterized by three parameters: propagation delay ($t_p$), angle of elevation ($\theta$), and angle of azimuth ($\varphi$). Global coding matrix may be generated by linear combination of these three attributes and a unique lattice code may be generated for each UE at different locations from the base station. Thus, considering the coding gain increases with increasing the distance between the codes, aspects of the present disclosure take advantage of geometrical properties of lattice. Particularly, within the 3D waveform coding, if lattice distance between co-beamed UEs is determined to be greater than threshold radius, a conjugate lattice code for the UEs may be applied in accordance with aspects of the present disclosure.

30 Claims, 11 Drawing Sheets

(51) Int. Cl.
*H04W 72/04* (2009.01)
*H04L 1/00* (2006.01)

(58) Field of Classification Search
CPC .. H04B 7/0619; H04B 7/0413; H04B 7/0417;
H04B 7/0421; H04B 7/0452; H04B
7/024; H04B 7/0671; H04W 36/16;
H04W 36/20; H04W 36/0005; H04W
72/044; H04W 72/0466; H04W 72/08;
H04W 72/082; H04W 72/085
See application file for complete search history.

INTER USER INTERFERENCE CONTROL TECHNIQUES

CROSS-REFERENCE TO RELATED APPLICATION(S)

The application claims benefit of U.S. Provisional Application Ser. No. 62/953,816, entitled "5G NEW RADIO 3D WAVEFORM—INTER USER INTERFERENCE," and filed Dec. 26, 2019, which is expressly incorporated by reference herein in its entirety.

BACKGROUND

The present disclosure relates to wireless communication systems, and more particularly, to inter-user interference management techniques.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, inter-user interference (IUI) for multiple user equipments (UEs) that may be served with the same beam from the base station are a significant concern yet to be addressed for 5G NR systems. Thus, improvements in wireless communication operations may be desired.

SUMMARY

Aspects of the present disclosure solve the above-identified problem by implementing a new 3D waveform coding scheme that leverages the spatial properties of 5G NR systems. Specifically, in 5G systems, each UE location may be characterized by three parameters: propagation delay ($t_p$), angle of elevation ($\theta$), and angle of azimuth ($\varphi$). A global coding matrix may be generated by linear combination of these three attributes and a unique lattice code may be generated for each UE at different location from base station. Thus, considering the coding gain increases with increasing the distance between the codes, aspects of the present disclosure take advantage of geometrical properties of lattice. Particularly, within the 3D waveform coding, if lattice distance between co-beamed UEs is determined to be greater than threshold radius, a conjugate lattice code for the UEs may be applied in accordance with aspects of the present disclosure. The lattice distance may be determined by Voronoi lattice concept.

In one example, a method for wireless communication is disclosed. The method may include allocating a first lattice code for a first user equipment (UE) to use for communications with a base station. The method may further comprise allocating a second lattice code for a second UE to use for communications with the base station. The method may further comprise determining whether a lattice distance between the first UE and the second UE that are served by a same beam from the base station exceeds an IUI threshold. The method may further comprise transmitting from the base station to the second UE a conjugate lattice code to use for communications with the base station in order to mitigate IUI based on a determination that the lattice distance between the first UE and the second UE exceeds the IUI threshold, wherein the conjugate lattice code is a conjugate of the second lattice code.

In another example, an apparatus for wireless communications. The apparatus may include a memory having instructions and a processor configured to execute the instructions to allocate a first lattice code for a first UE to use for communication with a base station. The apparatus may further include instructions executable by the processor to allocate a second lattice code for a second UE to use for communication with the base station. The apparatus may further include instructions executable by the processor to determine whether a lattice distance between the first UE and the second UE that are served by a same beam from the base station exceeds an IUI threshold. The apparatus may further include instructions executable by the processor to transmit from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

In some aspects, a non-transitory computer readable medium includes instructions stored therein that, when executed by a processor, cause the processor to perform the steps of allocating a first lattice code for a first UE to use for communication with a base station. The method may further comprise allocating a second lattice code for a second UE to use for communication with the base station. The method may further comprise determining whether a lattice distance between the first UE and the second UE that are served by a same beam from the base station exceeds an IUI threshold. The method may further comprise transmitting from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

In certain aspects, another apparatus for wireless communication is disclosed. The apparatus may include means for allocating a first lattice code for a first UE to use for communication with a base station. The apparatus may further comprise means for allocating a second lattice code for a second UE to use for communication with the base station. The apparatus may further comprise means for determining whether a lattice distance between the first UE and the second UE that are served by a same beam from the base station exceeds an IUI threshold. The apparatus may further comprise means for transmitting from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
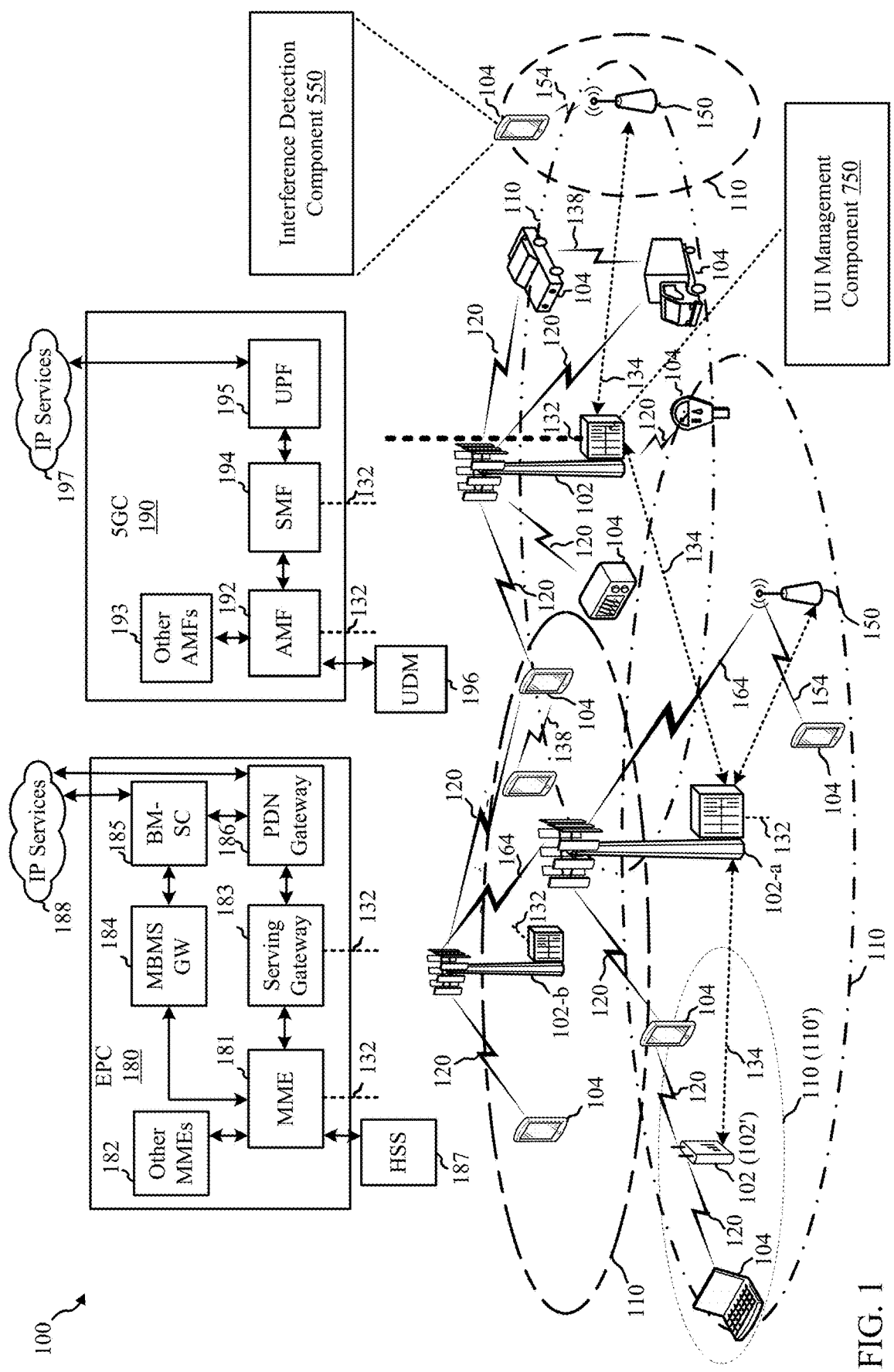
FIG. 1 is a schematic diagram of an example of a wireless communications system in accordance with aspects of the present disclosure.

In wireless communications systems, a "near-far" problem refers to the effect of a strong signal from a near signal source in making it difficult for a receiver to hear a weaker signal from a further source due to adjacent-channel interference, co-channel interference, distortion, capture effect, dynamic range limitation, or the link. For example, consider a receiver and two transmitters, one close to the receiver, the other far away. If both transmitters transmit simultaneously and at equal powers, then due to the inverse square law the receiver will receive more power from the transmitter that is located closer than the one located further away. Thus, since one transmission's signal is the other's noise, the signal-to-noise ratio (SNR) for the further transmitter is much lower. This makes the farther transmitter more difficult, if not impossible, to decode. In short, the near-far problem is one of detecting or filtering out a weaker signal amongst stronger signals.

One aspect of the 5G NR communications technology includes the use of high-frequency spectrum bands, such as those above 24 GHz, which may be referred to as millimeter wave (mmW) bands. The use of these bands enables extremely high data rates and significant increases in data processing capacity. However, compared to LTE, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, may change the channel conditions between the base station (BS) and the user equipment (UE), and thus impact communication performance.

Current mmW 5G NR systems leverage the small wavelengths of mmW at the higher frequencies to make use of multiple input multiple output (MIMO) antenna arrays to create highly directional beams that focus transmitted radio frequency (RF) energy in order to attempt to overcome the propagation and path loss challenges in both the uplink and downlink links. The isotropic path loss and the propagation characteristics of the mmWave environment, however, demands a dense next generation node base station (gNBs) (i.e., base stations in NR technology) deployment to guarantee line-of-sight links at any given time and to decrease the outage probability.

The near-far problem discussed above is exacerbated for wideband systems, multiple input multiple output (MIMO) systems, and 5G NR communication systems because it results in unwanted IUI problems even in the enumerated 5G NR waveform systems. Indeed, the IUI and adjacent channel interference (ACI) are a significant concern yet to be addressed for 5G NR systems. In time division duplex (TDD) systems, the IUI is more severe in inter cell scenarios due to overlapped beams in 5G NR.

In recent years, non-orthogonal multiple access (NOMA) schemes have received significant attention for the 5G NR systems. The primary reason for adopting NOMA in 5G owes to its ability of serving multiple users using the same time and frequency resources. There exist two main NOMA techniques: power-domain and code-domain. Power-domain NOMA attains multiplexing in power domain, whereas code-domain NOMA achieves multiplexing in code domain. In NOMA, however, IUI may be even a bigger concern and the complexity of systems to handle IUI increases severely for user equipment (UE) and base station. Thus, current systems are ill-equipped to handle IUI for 5G NR systems.

Aspects of the present disclosure solve the above-identified problem by implementing a new 3D waveform coding scheme that leverages the spatial properties of 5G NR systems. Specifically, in 5G systems, each UE location may be characterized by three parameters: propagation delay ($t_p$), angle of elevation ($\theta$), and angle of azimuth ($\varphi$). Global coding matrix may be generated by linear combination of these three attributes and a unique lattice code may be generated for each UE at different locations from the base station. Thus, considering the coding gain increases with increasing the distance between the codes, aspects of the present disclosure take advantage of geometrical properties of lattice. Particularly, within the 3D waveform coding, if lattice distance between co-beamed UEs is determined to be greater than a threshold radius, a conjugate lattice code for the UEs may be applied in accordance with aspects of the present disclosure. The lattice distance may be determined by Voronoi lattice concept.

Voronoi lattice concept builds on mathematics concept introduced by a Russian mathematician, Georgy Voronoi, that introduced the concept of Voronoi diagram that is a partitioning of a plane into regions based on distance to points (called seeds) in a specific subset of the plane. The set of points may be predetermined, and for each seed there may be a corresponding region consisting of all points closer to that seed than to any other. The plane partitioning based on the Voronoi diagram is used intensively in theoretical as well as applied fields of science.

Thus, aspects of the present disclosure utilize the Voronoi lattice concept to identify the lattice distance between co-beamed UEs. For instance, each UE in a wireless network may be designated with a lattice vector (^($t_p$, $\theta$, $\varphi$)) which may be a combination of propagation delay ($t_p$), angle of elevation ($\theta$), and angle of azimuth ($\varphi$). The base station and/or UE may identify IUI for multiple UEs (e.g., first UE and second UE) that may be served with the same beam from the base station. Thus, in instances where the two UEs may be differentiated only by the propagation delay (e.g., where the elevation and azimuth angles are same for both UEs), features of the present disclosure present techniques to perform lattice conjugate hopping for one or more UEs to use conjugate of a different UE such that the coding for different UEs on the same beam is different giving immunity to IUI. The higher immunity to interference can therefore be achieved in the present disclosure by ensuring higher lattice distance between two UEs in the same beam coverage or overlapped beam coverage.

Various aspects are now described in more detail with reference to the FIGS. 1-8. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100 for IUI management techniques using Voronoi lattice packing. In particular, The wireless communications system 100 may include one or more base stations 102, one or more UEs 104, and a core network, such as an Evolved Packet Core (EPC) 180 and/or a 5G core (5GC) 190. The one or more base stations 102 and/or UEs 104 may operate according to millimeter wave (mmW or mmWave) technology. For example, mmW technology includes transmissions in mmW frequencies and/or near mmW frequencies. Specifically, extremely high frequency (EHF) is part of the radio frequency (RF) in the electromagnetic spectrum where the EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave.

In some examples, the base station 102 may include IUI management component 750 in collaboration with an interference detection component 550 included in UEs 104 for implementing a new 3D waveform coding scheme that leverages the spatial properties of 5G NR systems. Specifically, IUI management component 750 may track the location of each UE location based on three parameters: propagation delay ($t_p$), angle of elevation ($\theta$), and angle of azimuth ($\varphi$) that may be transmitted by the UE 104 to the base station 102. In turn, the IUI management component 750 of the base station 102 may generate a global coding matrix (e.g., Voronoi codebook) based on one or more of the propagation delay, angle of elevation, and angle of azimuth information received from the UE 104. The global coding matrix may allocate a unique lattice code that is generated by the base station 102 to each UE 104 at different locations from the base station 102. The IUI management component 750 may further download or transmit the global coding matrix (e.g., voronoi codebook) to one or more UEs 104 via radio resource control (RRC) reconfiguration. In some examples, transmitting the global coding matrix via RRC reconfiguration may further include additional information such as volume noise ratio (VNR) or normalized volume noise ratio (NVNR) of UE's 104 Voronoi vertex points and that of co-vertex UE 104, and/or vertex hull information which is a beam coverage.

In further examples, the IUI management component 750 of the base station 102 may maintain and evaluate lattice distance for IUI key performance indicator (KPI) in terms of VNR and/or NVNR within a beam coverage or convex hull. If the IUI management component 750 detects NVNR of a vertex point is over a given threshold, then the base station 102 may decide to handover or beam switch of UE to its conjugate of Voronoi codebook.

Similarly, the interference detection component 550 included in UEs 104 may continuously evaluate lattice distance for IUI KPI in terms of NVNR within a beam coverage. If the interference detection component 550 of the UE 104 detects that the NVNR of a vertex point is over a given threshold, then the UE 104 may request lattice distance evaluation to base station 102 and the IUI management component 750 may handover or beam switch the UE 104 to the conjugate of Voronoi codebook.

The EPC 180 and/or the 5GC 190 may provide user authentication, access authorization, tracking, internet protocol (IP) connectivity, and other access, routing, or mobility functions. The base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC 180 or the 5GC 190), with one another over backhaul links 132, 134 (e.g., Xn, X1, or X2 interfaces) which may be wired or wireless communication links.

The base stations 102 may wirelessly communicate with the UEs 104 via one or more base station antennas. Each of the base stations 102 may provide communication coverage for a respective geographic coverage area 110. In some examples, base stations 102 may be referred to as a base transceiver station, a radio base station, an access point, an access node, a radio transceiver, a NodeB, eNodeB (eNB), gNB, Home NodeB, a Home eNodeB, gNodeB (gNB), a relay, a transceiver function, a basic service set (BSS), an extended service set (ESS), a transmit reception point (TRP), or some other suitable terminology. The geographic coverage area for a base station 102 may be divided into sectors or cells making up only a portion of the coverage area (not shown). The wireless communication network 100 may include base stations 102 of different types (e.g., macro base stations 102 or small cell base stations, described below).

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. The wireless communication network 100 may be a heterogeneous technology network in which different types of base stations provide coverage for various geographical regions. For example, each base station 102 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 104 with service subscriptions with the network provider. A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 104 with service subscriptions with the network provider. A femto cell may also cover a small geographic area (e.g., a home) and may provide restricted access and/or unrestricted access by UEs 104 having an association with the femto cell (e.g., in the restricted access case, UEs 104 in a closed subscriber group (CSG) of the base station 102, which may include UEs 104 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network support of radio bearers for the user plane data. At the physical (PHY) layer, the transport channels may be mapped to physical channels.

The UEs 104 may be dispersed throughout the wireless communication network 100, and each UE 104 may be stationary or mobile. A UE 104 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 104 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 104 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 104 may be able to communicate with various types of base stations 102 and network equipment including macro eNBs, small cell eNBs, macro gNBs, small cell gNBs, gNB, relay base stations, and the like.

UE 104 may be configured to establish one or more wireless communication links 120 with one or more base stations 102. The wireless communication links 120 shown in wireless communication network 100 may carry uplink (UL) transmissions from a UE 104 to a base station 102, or downlink (DL) transmissions, from a base station 102 to a UE 104. Each wireless communication link 120 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 120 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 120 may represent one or more broadcast channels.

In some aspects of the wireless communication network 100, base stations 102 or UEs 104 may include multiple antennas for employing antenna diversity schemes to improve communication quality and reliability between base stations 102 and UEs 104. Additionally or alternatively, base stations 102 or UEs 104 may employ multiple input multiple output (MIMO) techniques that may take advantage of multi-path environments to transmit multiple spatial layers carrying the same or different coded data.

Wireless communication network 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 104 may be configured with multiple downlink CCs and one or more uplink CCs for carrier aggregation. Carrier aggregation may be used with both FDD and TDD component carriers. The communication links 120 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc., MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communication network 100 may further include base stations 102 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

In a non-limiting example, the EPC 180 may include a Mobility Management Entity (MME) 181, other MMES 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
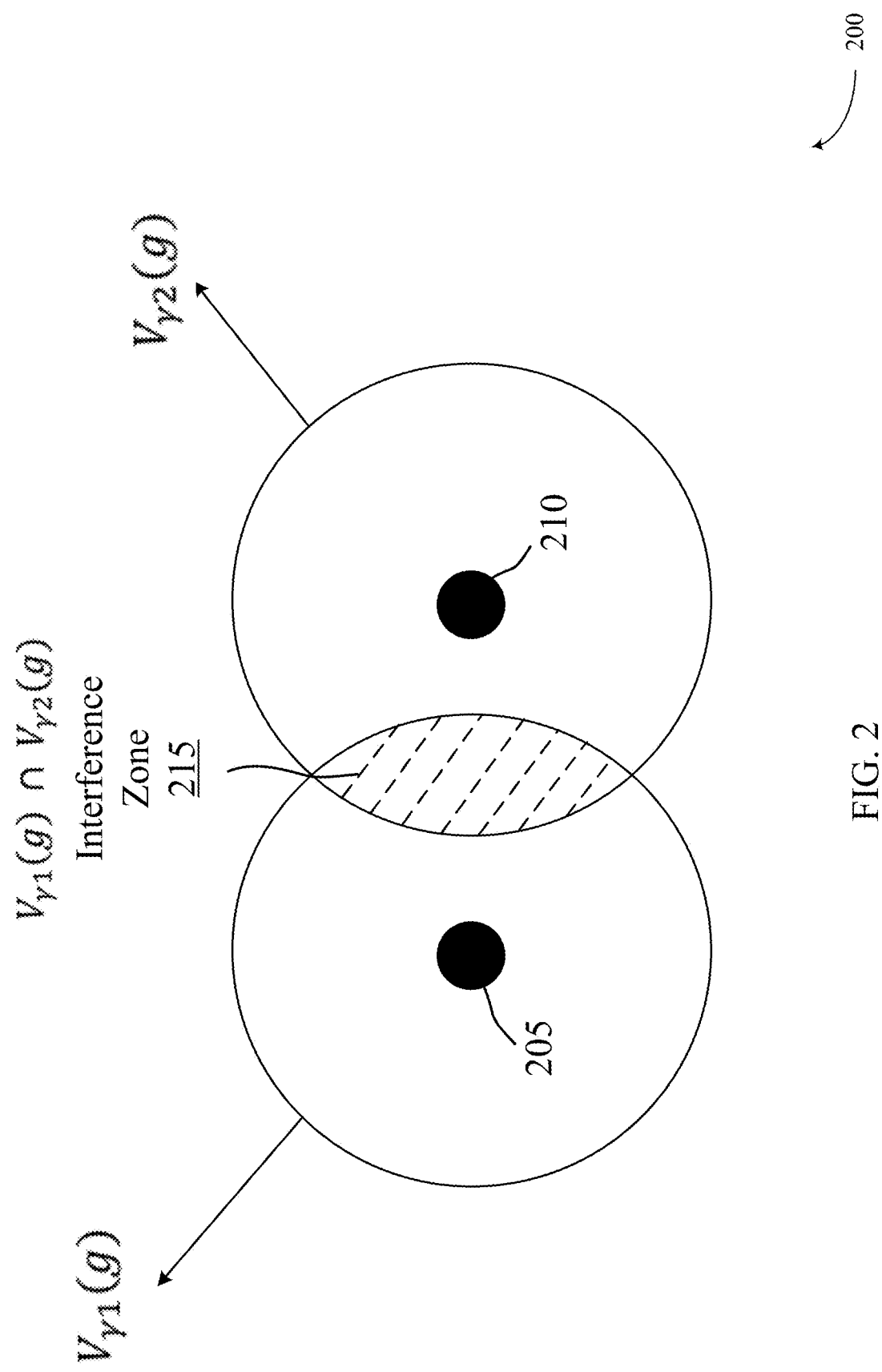
FIG. 2 is a schematic diagram of an example Voronoi lattice framework for UE coding in accordance with aspects of the present disclosure.

Referring to FIG. 2, an example Voronoi lattice framework for UE coding is illustrated where each UE 104 is allocated a lattice vector (g) that is a combination of propagation delay ($t_p$), angle of elevation ($\theta$), and angle of azimuth ($\varphi$) of the UE 104 with respect to the base station 102 such that the vector may be represented as $\hat{}(t_p, \theta, \varphi)$. In some examples, the lattice of each UE 104 with lattice distance may define a Voronoi lattice region such that UE 104 within this region 215 may have same lattice code assigned by the base station 102.

As discussed above, aspects of the present disclosure utilize the Voronoi lattice concept to identify the lattice distance between co-beamed UEs 104. For instance, each UEs may be designated with a lattice vector ($\hat{}(t_p, \theta, \varphi)$) and the base station 102 and/or UE 104 may identify IUI 215 for multiple UEs (e.g., first UE 205 and second UE 210) that may be served with the same beam from the base station 102. Thus, in instances where the two UEs 104 may be differentiated only by the propagation delay (e.g., where the elevation and azimuth angles are same for both UEs), features of the present disclosure present techniques to perform lattice conjugate hopping (see FIG. 3B) for one or more UEs 104 to use conjugate of a different UE such that the coding for different UEs on the same beam is different and provide immunity to IUI. The higher immunity to interference can therefore be achieved in the present disclosure by ensuring higher lattice distance between two UEs in the same beam coverage or overlapped beam coverage.

Figure 3A:
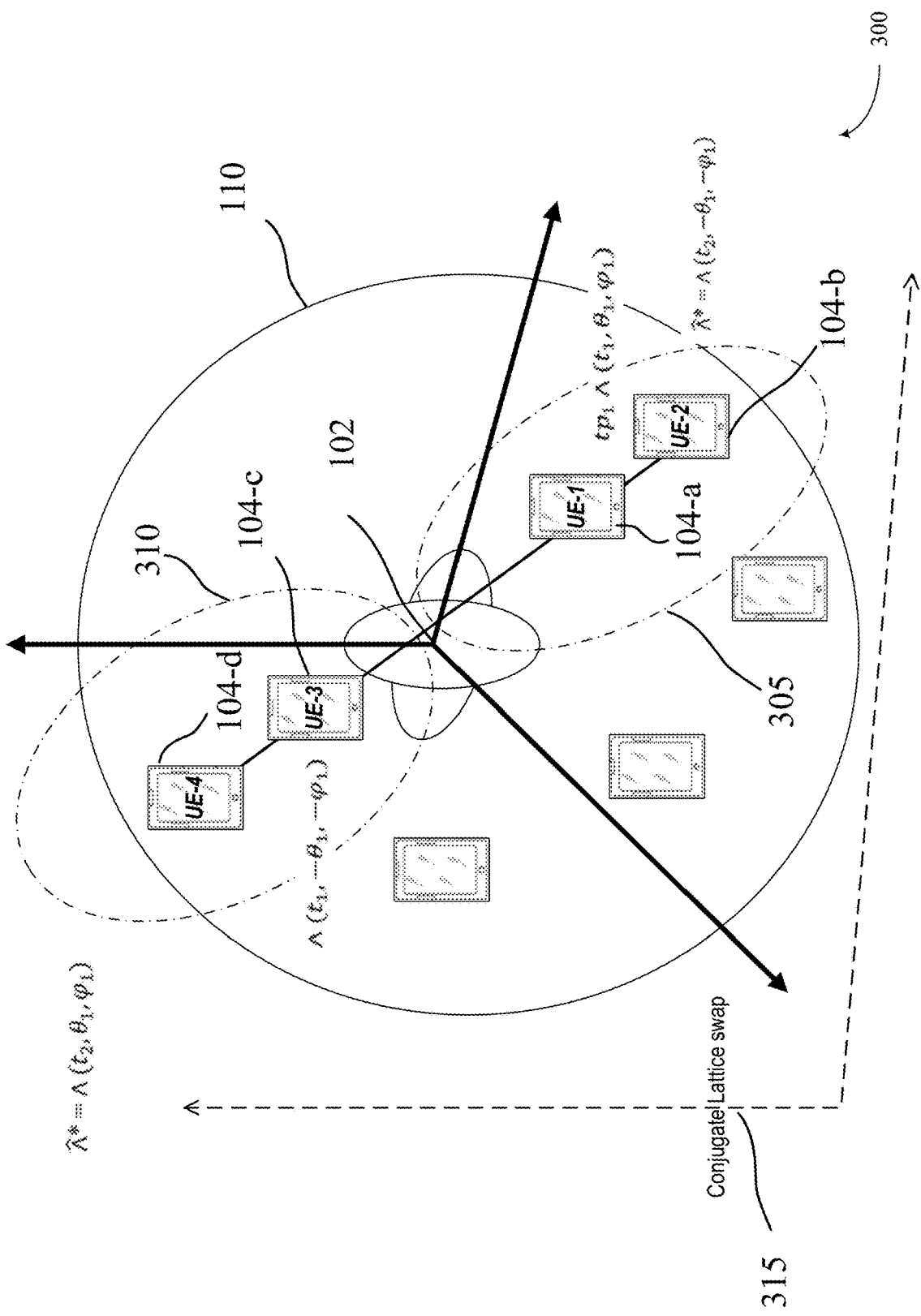
FIG. 3A is a schematic diagram of an example wireless communications system with UEs located within the coverage area of a base station that may employ Voronoi lattice code hopping in accordance with aspects of the present disclosure.

FIG. 3A is a schematic diagram of an example wireless communications system 300 with UEs 104 located within the coverage area 110 of a base station 102 that may employ Voronoi lattice code hopping in accordance with aspects of the present disclosure in order to mitigate IUI. As illustrated, the three dimensional axis illustrates the central location of a base station 102 that may serve one or more UEs 104.

Current mmW 5G NR systems leverage the small wavelengths of mmW at the higher frequencies to make use of MIMO antenna arrays to create highly directional beams that focus transmitted RF energy in order to attempt to overcome the propagation and path loss challenges in both the uplink and downlink links. Thus, in some aspects, multiple UEs 104 (e.g., first UE 104-a and second UE 104-b) may be served by the same directional beam from the base station 102. Similarly, third UE 104-c and fourth UE 104-d may also be co-beamed from the base station.

The near-far problem discussed above where the effect of a strong signal from a near signal source makes it difficult for a receiver to detect and decode a weaker signal from a further source due to interference, is further exacerbated for and 5G NR communication systems because it results in unwanted IUI problems even in the enumerated 5G NR waveform systems. As discussed above, in recent years, NOMA schemes have received significant attention for the 5G NR systems. The primary reason for adopting NOMA in 5G owes to its ability of serving multiple users using the same time and frequency resources. There exist two main NOMA techniques: power-domain and code-domain. Power-domain NOMA attains multiplexing in power domain, whereas code-domain NOMA achieves multiplexing in code domain.

As illustrated in FIG. 3A, as one example, each of the first UE 104-a, second UE 104-b, third UE 104-c, and fourth UE 104-d may have similar elevation ($\theta$) and azimuth angle ($\varphi$), but may only be differentiated via the propagation delay ($t_p$) from the base station 102. Given that multiple UEs 104 may be served with same beam(s) from the base station 102 (e.g., first UE 104-a and second UE 104-b by first beam 305, and third UE 104-c and fourth UE 104-d by a second beam 310), generally the codes allocated to the first UE 104-a and second UE 104-b may be same or relatively indistinguishable from one another resulting in inter-user interference being experienced at the first UE 104-a and UE 104-b. Similarly, the codes generally allocated to the third UE 104-c and fourth UE 104-d may be similar.

Figure 3B:
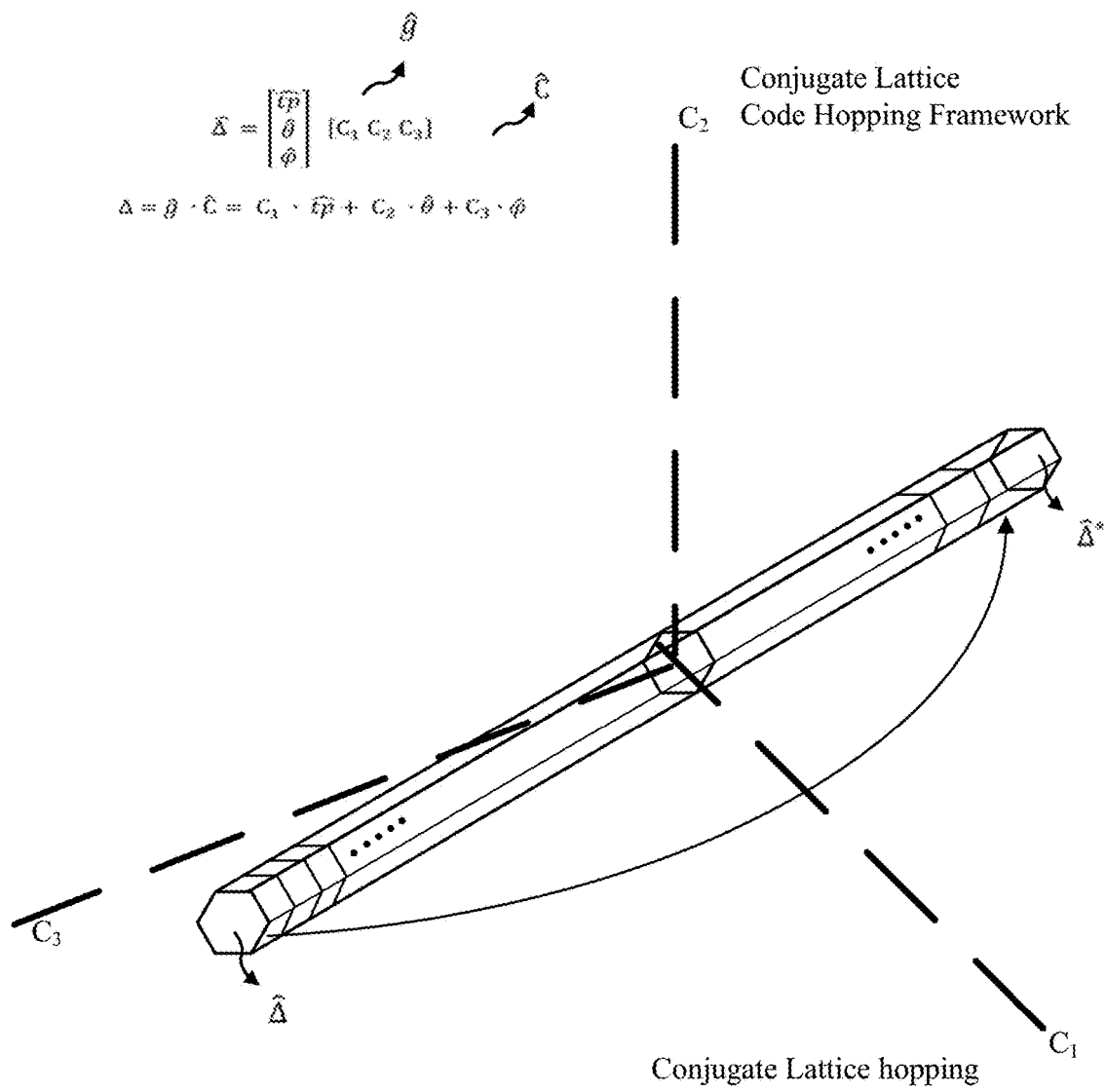
FIG. 3B is a diagram of an example conjugate lattice code hopping framework in accordance with aspects of the present disclosure.

However, due to the similarity in codes for co-beamed UEs 104, the UEs 104 may experience IUI. Aspects of the present disclosure solve this problem by implementing a new 3D waveform coding scheme that leverages the spatial properties of 5G NR systems. Specifically, in some examples, a global coding matrix may be generated by linear combination of based on location of UE 104 that may be characterized by three parameters: propagation delay ($t_p$), angle of elevation ($\theta$), and angle of azimuth ($\varphi$). Based on the global coding matrix, a unique lattice code may also be allocated for each UE 104 at different locations from the base station. Thus, considering the coding gain increases with increasing the distance between the codes, aspects of the present disclosure take advantage of geometrical properties of lattice. Particularly, within the 3D waveform coding, if lattice distance between co-beamed UEs is determined to be greater than threshold radius, a conjugate lattice code for the UEs, as illustrated in FIG. 3B, may be applied such that the first UE 104-a and the third UE 104-c may have the same code as calculated from same phase, and second UE 104-b and fourth UE 104-d may be conjugate codes, which may also be referred to as code hopping or swapping.

Figure 4A:
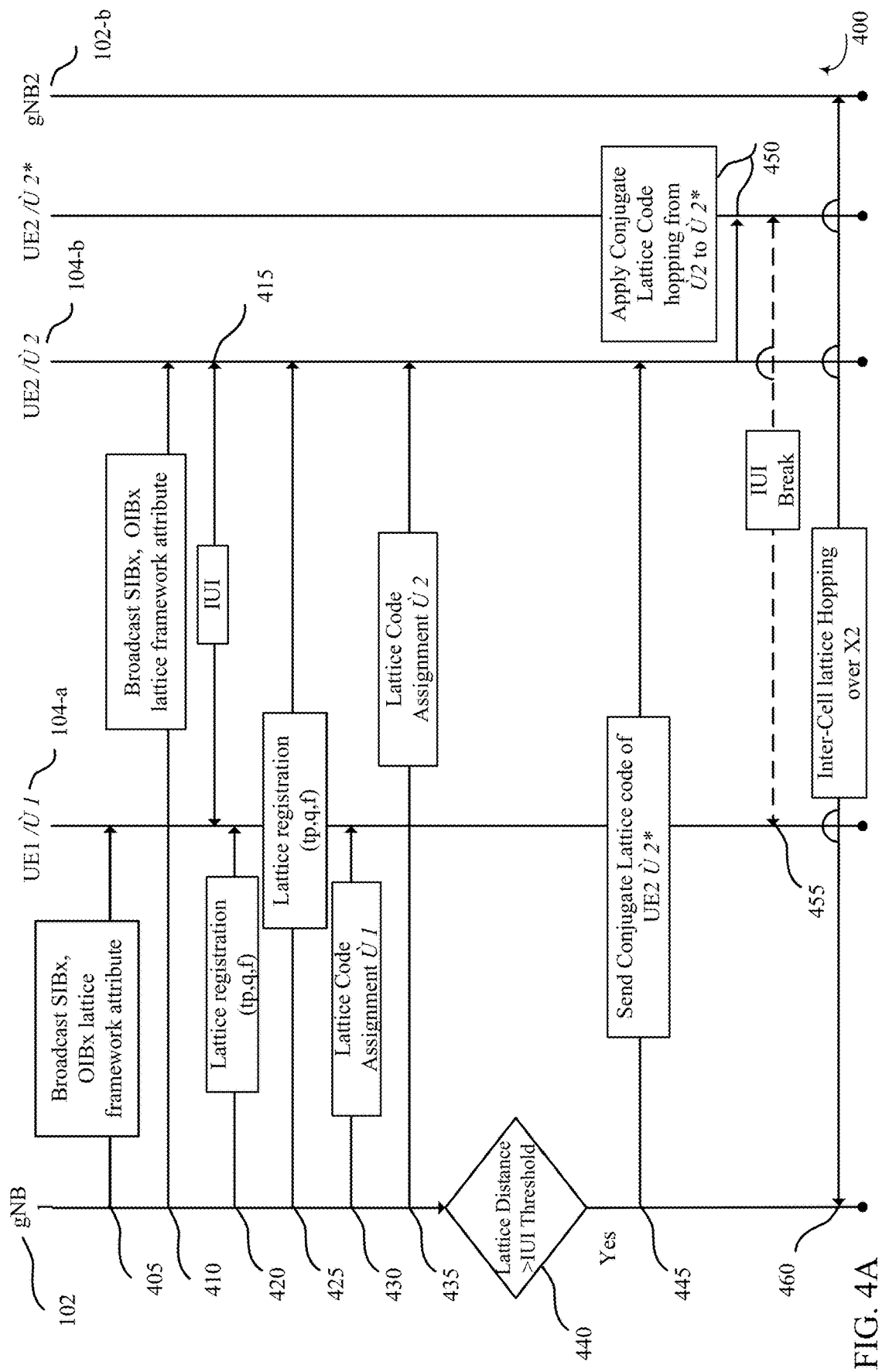
FIG. 4A is an example call flow diagram of multiple UEs that are co-beamed employing Voronoi lattice code hopping to mitigate IUI interference in accordance with aspects of the present disclosure.
Figure 4B:
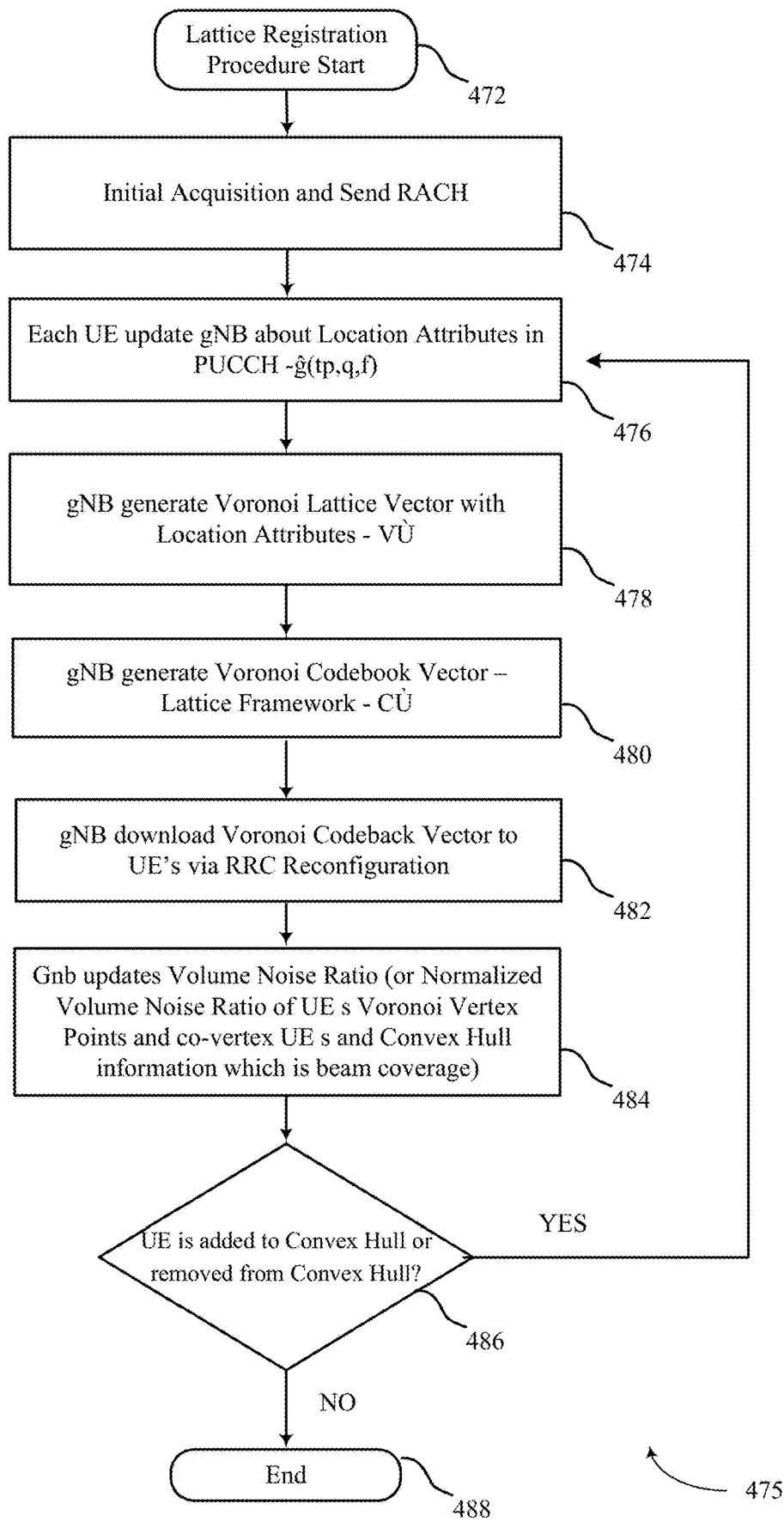
FIG. 4B is an example call flow diagram of lattice registration procedures in accordance with aspects of the present disclosure.

FIG. 4A is an example call flow diagram 400 illustrating the techniques for mitigating IUI via Voronoi lattice concepts. In one example, the base station 102 (gNB), at 405, may broadcast system information block (SIBx), OIBx lattice framework attributes to a first UE 104-a. Similarly, at 410, the base station 102 may broadcast the SIBx, OIBx lattice framework to a second UE 104-b. At 415, an inter-user interference between a first UE 104-a and the second UE 104-b may be detected.

At steps 420 and 425, the base station 102 may perform lattice registration for the one or more UEs 104. The lattice registration procedures are further elaborated with reference to FIG. 4B. Specifically, at step 472, the lattice registration procedure may start whereby at 474, each UE 104 may perform initial acquisition and random access channel (RACH) procedures based on the triggering of one or more events, including but not limited to beam switching, handover or beam failure recovery, beam failure recovery, and/or RRC reconfiguration. At 476, each UE 104 within the coverage area of the base station 102 may update the base station 102 about location attributes (e.g., propagation delay ($t_p$), angle of elevation ($\theta$), and angle of azimuth ($\varphi$) of the UE 104 relative to the base station 102) in physical uplink control channel (PUCCH). Based on the one or more location attributes, the base station 102, at 478, may generate Voronoi lattice vector ($\hat{}(t_p, \theta, \varphi)$). At 480, the base station 102 may generate a Voronoi codebook which may be a lattice framework within a beam coverage of the base station 102. At 482, the base station 1021 may transmit the Voronoi codebook to each UE 104 via RRC reconfiguration with additional attribute information (at step 484) such as Volume Noise Ratio (or Normalized Volume Noise Ratio) of UE's Voronoi vertex points and co-vertex UEs, and/or vertex hull. At 486, the base station 102 may determine if the UE is added to convex hull or removed from the convex hull (e.g., if the UE 104 moves out of the beam coverage area of the base station). At 486, the registration process may be terminated.

Returning to FIG. 4A, at steps 430 and 435, the base station 102 may assign a lattice code to each of the first UE 104-a and the second UE 104-b. At 440, the base station 102 may determine whether the lattice distance exceeds an IUI threshold, and if so, at 445, may transmit a conjugate lattice code to one of the first UE 104-a or second UE 104-b. At 450, the base station may apply the conjugate lattice code hopping in order to break the IUI interference between the first UE 104-a and the second UE 104-b.

Figure 4C:
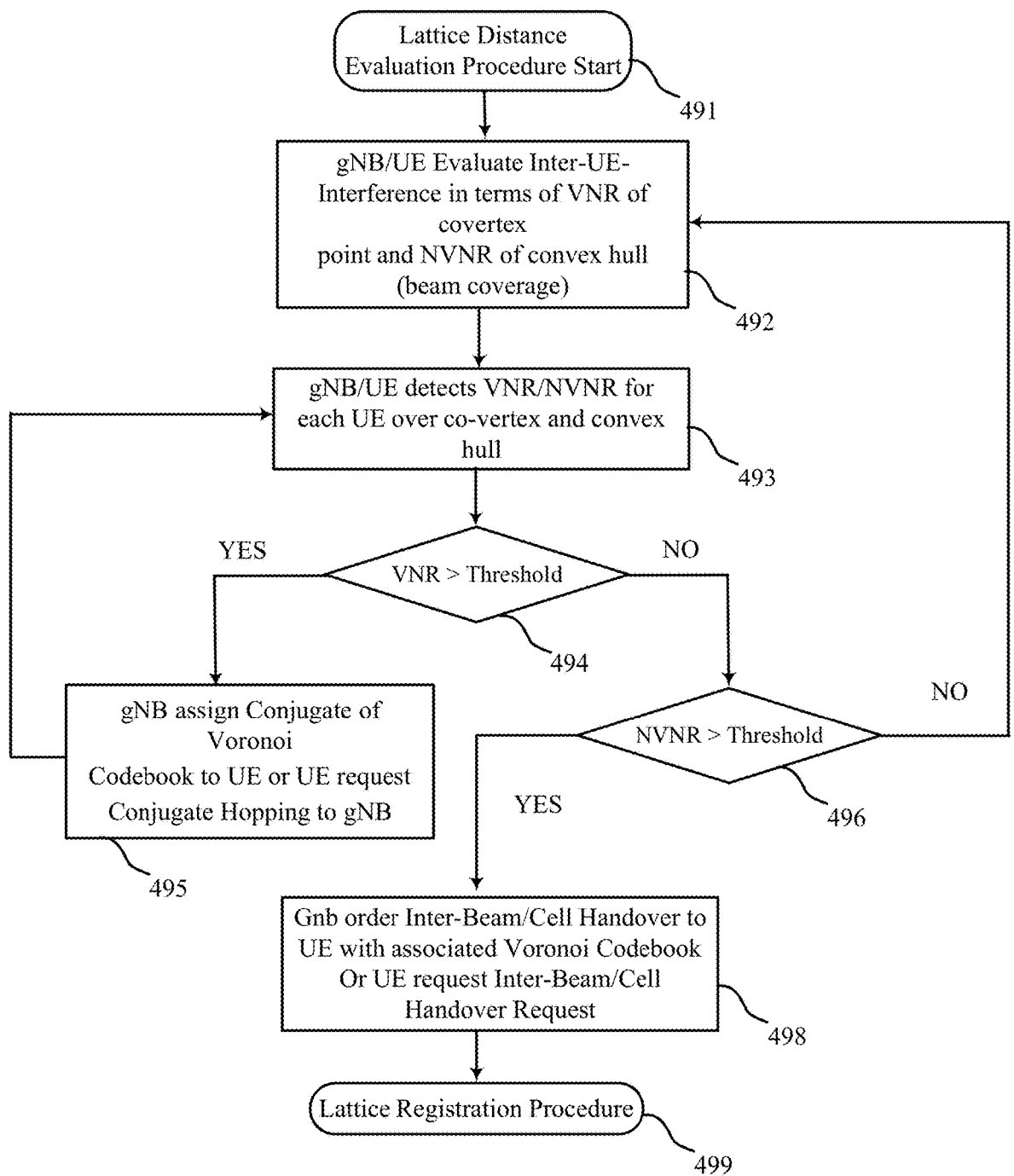
FIG. 4C is an example call flow diagram of lattice distance evaluation procedures in accordance with aspects of the present disclosure.

Specifically, as illustrated in FIG. 4C, the determination of whether to instruct the UE 102 to switch the code assignment to the conjugate of Voronoi cookbook is initiated at step 491 when the lattice distance evaluation procedure starts. It should be appreciated that although aspects of the evaluation are described with reference to the base station 102, both the base station and UEs can estimate lattice distance and dynamically maintain interference-free lattice distance. Indeed, at 492, the base station 102 and/or UE 104 may evaluate inter-user interference in terms of VNR of co-vertex point and NVNR of convex hull (e.g., beam coverage). At 493, the base station and/or UE may detect VNR/NVNR for each UE over co-vertex and convex hull.

If, at 494, the base station and/or UE detects VNR of a vertex point is over a given threshold, then the base station 102, at 495, may decide to handover or beam switch the UE 104 to its conjugate of Voronoi codebook or the UE may request conjugate hopping from the base station. If, at 494, the base station and/or UE determine that VNR does not exceed the given threshold, the base station and/or UE, at 496, may determine whether the NVNR exceeds the threshold. If so, the base station, at 498, may order inter-beam or cell handover to UE with associated Voronoi codebook. Similarly, the UE may also request inter-beam/cell handover request. If, at 496, the base station determines that NVNR is less than the threshold, the process may return to step 492 to continuously evaluate IUI. In some instances, at step 460 of FIG. 4A, the inter-cell lattice hopping may also be performed between a first base station 102-a and the second base station 102-b.

Figure 5:
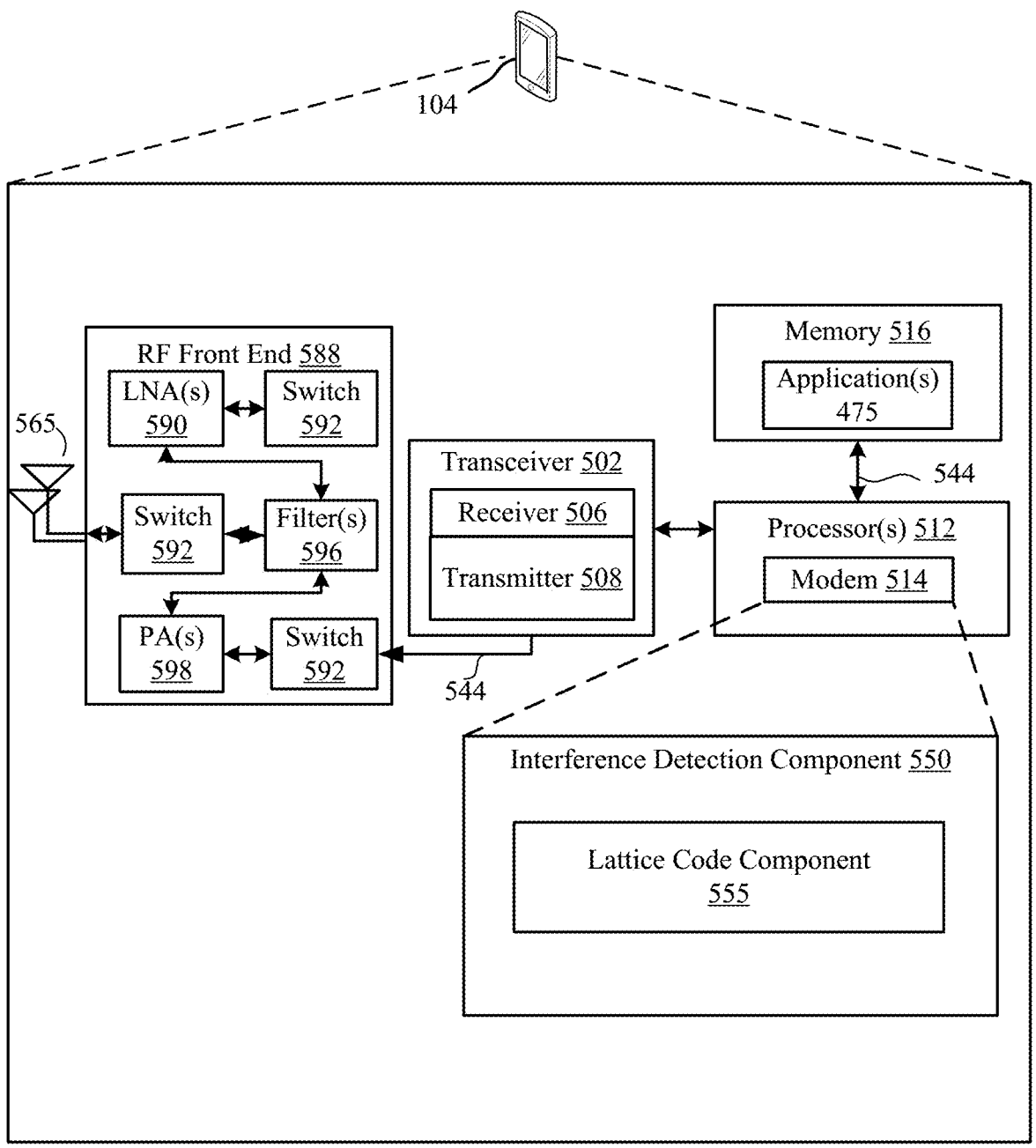
FIG. 5 is an example hardware schematic diagram of a user equipment mitigating IUI interference in accordance with aspects of the present disclosure.

Referring to FIG. 5, an example of a UE 104 that includes hardware components and subcomponents for implementing one or more methods (e.g., methods 600) described herein in accordance with various aspects of the present disclosure. For example, one example of an implementation of the UE 104 may include a variety of components, some of which have already been described above, but including components such as one or more processors 512, memory 516 and transceiver 502 in communication via one or more buses 544, which may operate in conjunction with the interference detection component 550 to perform functions described herein related to including one or more methods (e.g., 600) of the present disclosure.

The one or more processors 512, modem 514, memory 516, transceiver 502, RF front end 588 and one or more antennas 565, may be configured to support voice and/or data calls (simultaneously or non-simultaneously) in one or more radio access technologies. In an aspect, the one or more processors 512 may include a modem 514 that uses one or more modem processors. The various functions related to interference detection component 550 may be included in modem 514 and/or processors 512 and, in an aspect, may be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with interference detection component 550 may be performed by transceiver 502. The one or more antennas 565 may include stand-alone antennas and/or antenna arrays. The interference detection component 550 may also include lattice code component 555 for receiving a first lattice code assignment from the base station based in part on the location vector information transmitted to the base station.

The memory 516 may be configured to store data used herein and/or local versions of application(s) 575 or interference detection component 550 and/or one or more of its subcomponents being executed by at least one processor 512. The memory 516 may include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining interference detection component 550 and/or one or more of its subcomponents, and/or data associated therewith, when the UE 104 is operating at least one processor 512 to execute interference detection component 550 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one UE 104. Additionally, receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may including, but is not limited to, an RF transmitter.

Moreover, in an aspect, transmitting device may include the RF front end 588, which may operate in communication with one or more antennas 565 and transceiver 502 for receiving and transmitting radio transmissions, for example, wireless communications transmitted by at least one base station 102, or wireless transmissions transmitted to and by another UE 104, in for example D2D communication. The RF front end 588 may be connected to one or more antennas 565 and may include one or more low-noise amplifiers (LNAs) 590, one or more switches 592, one or more power amplifiers (PAs) 598, and one or more filters 596 for transmitting and receiving RF signals.

In an aspect, the LNA 590 may amplify a received signal at a desired output level. In an aspect, each LNA 590 may have a specified minimum and maximum gain values. In an aspect, the RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 may be used by the RF front end 588 to filter a received signal to obtain an input RF signal. Similarly, in an aspect, for example, a respective filter 596 may be used to filter an output from a respective PA 598 to produce an output signal for transmission. In an aspect, each filter 596 may be connected to a specific LNA 590 and/or PA 598. In an aspect, the RF front end 588 may use one or more switches 592 to select a transmit or receive path using a specified filter 596, LNA 590, and/or PA 598, based on a configuration as specified by the transceiver 502 and/or processor 512.

As such, the transceiver 502 may be configured to transmit and receive wireless signals through one or more antennas 565 via the RF front end 588. In an aspect, the transceiver 502 may be tuned to operate at specified frequencies such that transmitting device may communicate with, for example, one or more base stations 102 or one or more cells associated with one or more base stations 102. In an aspect, for example, the modem 514 may configure the transceiver 502 to operate at a specified frequency and power level based on the configuration of the transmitting device and the communication protocol used by the modem 514.

In an aspect, the modem 514 may be a multiband-multimode modem, which may process digital data and communicate with the transceiver 502 such that the digital data is sent and received using the transceiver 502. In an aspect, the modem 514 may be multiband and be configured to support multiple frequency bands for a specific communications protocol. In an aspect, the modem 514 may be multimode and be configured to support multiple operating networks and communications protocols. In an aspect, the modem 514 may control one or more components of transmitting device (e.g., RF front end 588, transceiver 502) to enable transmission and/or reception of signals from the network based on a specified modem configuration. In an aspect, the modem configuration may be based on the mode of the modem 514 and the frequency band in use. In another aspect, the modem configuration may be based on UE configuration information associated with transmitting device as provided by the network during cell selection and/or cell reselection.

Figure 6:
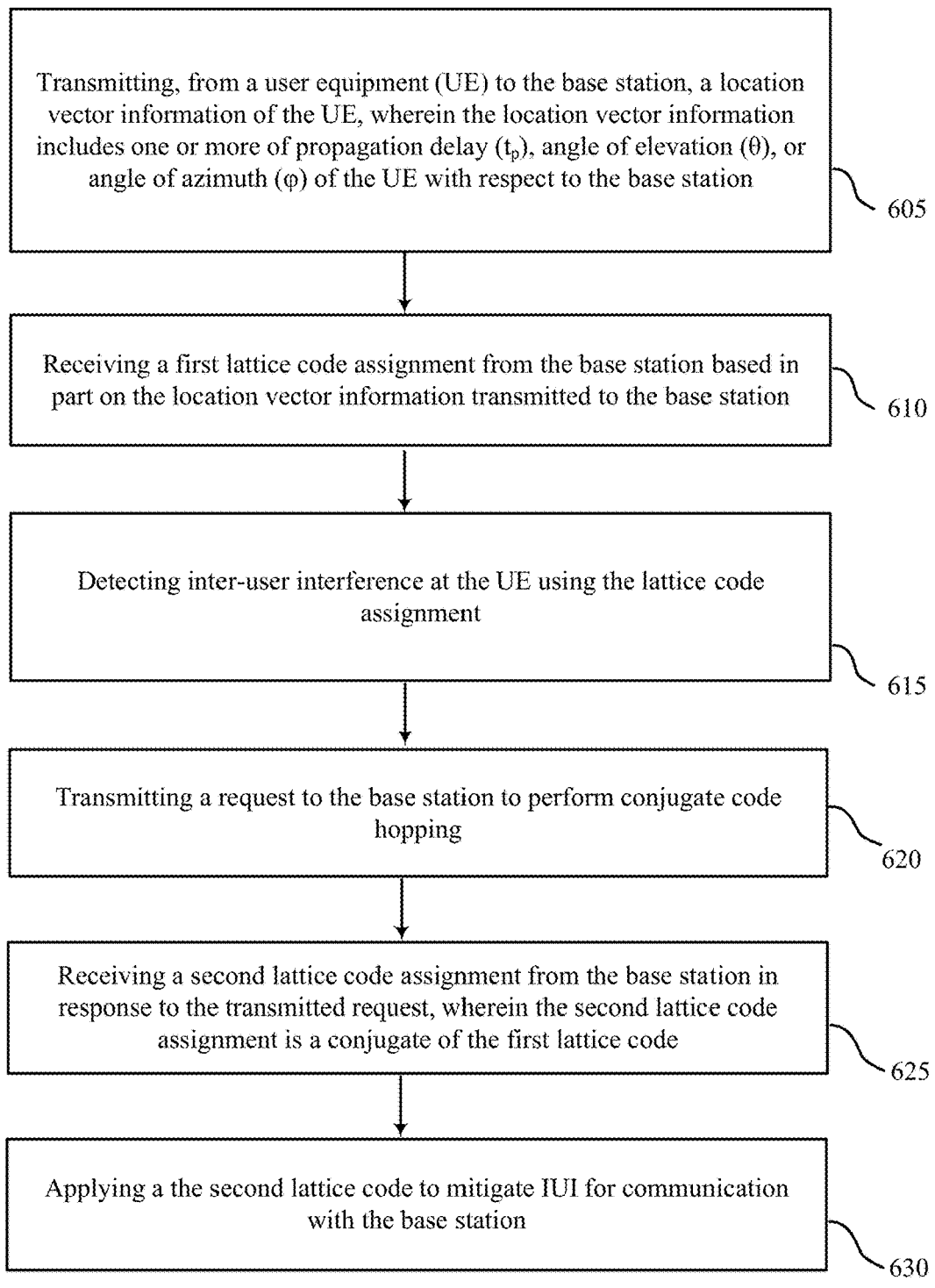
FIG. 6 is flow diagram of an example of a method of wireless communication implemented by the UE in accordance with aspects of the present disclosure.

Referring to FIG. 6, an example method 600 for wireless communications in accordance with aspects of the present disclosure may be performed by the UE 104 discussed with reference to FIGS. 1-5 Although the method 600 is described below with respect to the elements of the UE, other components may be used to implement one or more of the steps described herein.

At block 605, the method 600 may include transmitting, from a UE to the base station, location vector information of the UE. In some examples, the location vector information may include one or more of propagation delay (tp), angle of elevation (θ), or angle of azimuth (φ) of the UE with respect to the base station. Aspects of block 605 may be performed by a transceiver 502 described with reference to FIG. 5. Thus, the modem 514, processor 512, transceiver 502 and/or the UE 102 or one of its subcomponents may define the means for transmitting, from a UE to the base station, a location vector information of the UE.

At block 610, the method 600 may include receiving a first lattice code assignment from the base station based in part on the location vector information transmitted to the base station. In some examples, the UE may also receive a coding matrix from the base station that is generated based in part on a lattice vector associated with the UE, wherein the coding matrix allocates a unique lattice code for the UE within the coverage area of the base station. Aspects of block 610 may be performed by an interference detection component 550 and lattice code component 555 described with reference to FIG. 5. Thus, the modem 514, processor 512, interference detection component 550, lattice code component 555 and/or the UE 102 or one of its subcomponents may define the means for receiving a first lattice code assignment from the base station based in part on the location vector information transmitted to the base station.

At block 615, the method 600 may include detecting inter-user interference at the UE using the lattice code assignment. In some examples, the method 600 may further include determining whether a lattice distance between the UE and a second UE exceeds an inter-user interference threshold. Determining whether the lattice distance exceeds the inter-user interference threshold may include determining whether a VNR of a vertex point exceeds a VNR threshold, and requesting a conjugate of Voronoi codebook based on the determining that the VNR exceeds the VNR threshold. Aspects of block 615 may be performed by an interference detection component 550 described with reference to FIG. 5. Thus, the modem 514, processor 512, interference detection component 550, and/or the UE 102 or one of its subcomponents may define the means for detecting inter-user interference at the UE using the lattice code assignment.

At block 620, the method 600 may include receiving a second lattice code assignment from the base station in response to the transmitted request, wherein the second lattice code assignment is a conjugate of the first lattice code. Aspects of block 620 may be performed by the lattice code component 555 described with reference to FIG. 5. Thus, the modem 514, processor 512, lattice code component 555 and/or the UE 102 or one of its subcomponents may define the means for receiving a second lattice code assignment from the base station in response to the transmitted request, wherein the second lattice code assignment is a conjugate of the first lattice code.

At block 625, the method 600 may include applying a the second lattice code to mitigate IUI for communication with the base station. Aspects of block 625 may be performed by the lattice code component 555 described with reference to FIG. 5. Thus, the modem 514, processor 512, lattice code component 555 and/or the UE 102 or one of its subcomponents may define the means for applying a the second lattice code to mitigate IUI for communication with the base station.

Figure 7:
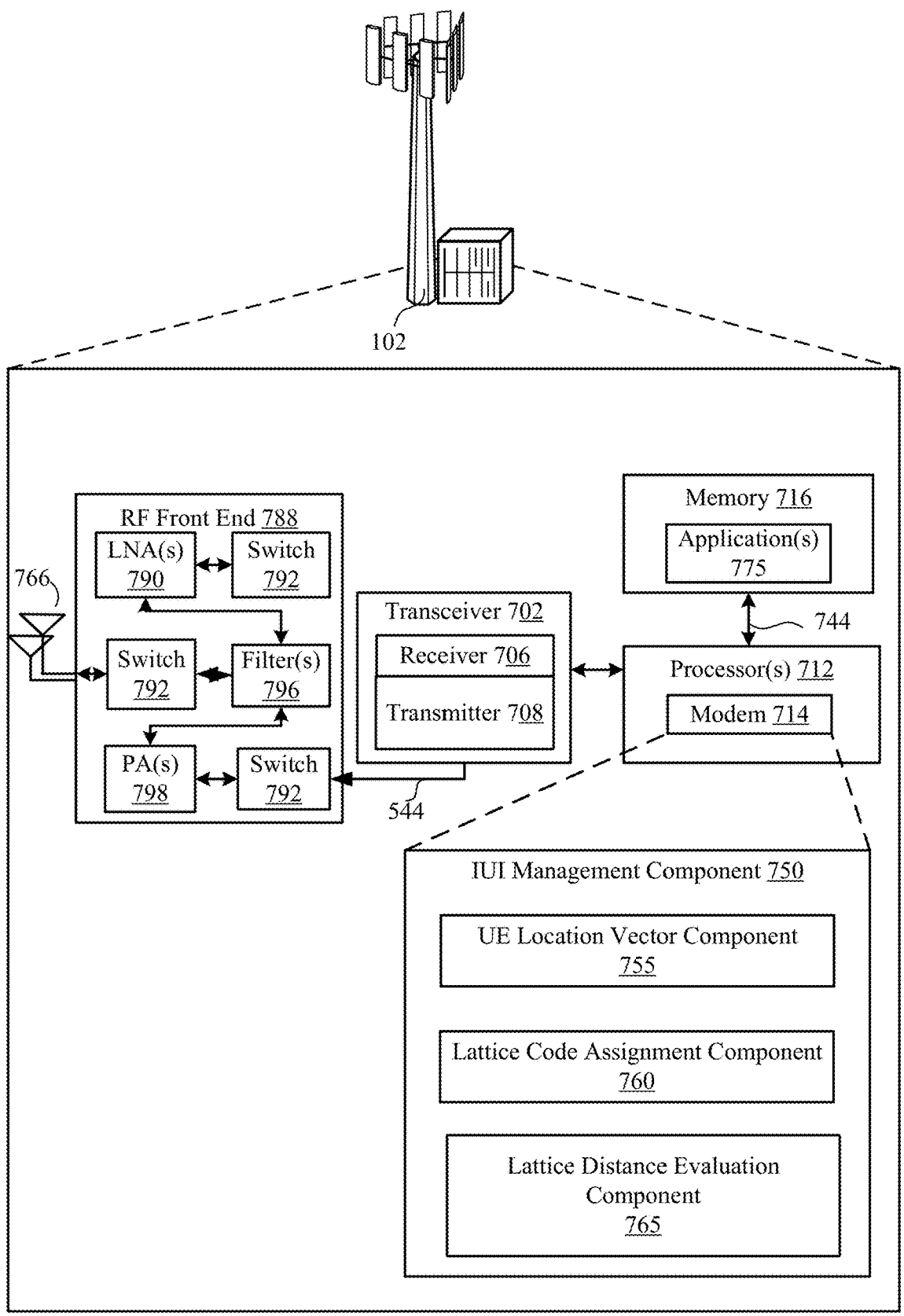
FIG. 7 is an example hardware schematic diagram of a base station mitigating IUI interference at co-beamed UEs in accordance with aspects of the present disclosure.

Referring to FIG. 7, an example of a base station 102 that includes hardware components and subcomponents for implementing one or more methods (e.g., methods 800) described herein in accordance with various aspects of the present disclosure. For example, one example of an implementation of the base station 102 may include a variety of components, some of which have already been described above, but including components such as one or more processors 712, memory 716 and transceiver 702 in communication via one or more buses 744, which may operate in conjunction with the IUI management component 750 to perform functions described herein related to including one or more methods (e.g., 800) of the present disclosure.

The one or more processors 721, modem 714, memory 716, transceiver 702, RF front end 788 and one or more antennas 766, may be configured to support voice and/or data calls (simultaneously or non-simultaneously) in one or more radio access technologies. In an aspect, the one or more processors 712 may include a modem 714 that uses one or more modem processors. The various functions related to IUI management component 750 may be included in modem 714 and/or processors 712 and, in an aspect, may be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 714 associated with IUI management component 750 may be performed by transceiver 702. The one or more antennas 766 may include stand-alone antennas and/or antenna arrays.

The memory 716 may be configured to store data used herein and/or local versions of application(s) 775 or IUI management component 750 and/or one or more of its subcomponents being executed by at least one processor 712. The memory 716 may include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, the memory 716 may be a non-transitory computer-readable storage medium that stores one or more computer-executable codes defining IUI management component 750 and/or one or more of its subcomponents, and/or data associated therewith, when the UE 102 is operating at least one processor 712 to execute IUI management component 750 and/or one or more of its subcomponents.

The transceiver 702 may include at least one receiver 706 and at least one transmitter 708. The receiver 706 may include hardware, firmware, and/or software code executable by a processor for receiving data, the code comprising instructions and being stored in a memory (e.g., computer-readable medium). The receiver 706 may be, for example, a radio frequency (RF) receiver. In an aspect, the receiver 706 may receive signals transmitted by at least one UE 104. Additionally, receiver 706 may process such received signals, and also may obtain measurements of the signals, such as, but not limited to, Ec/Io, SNR, RSRP, RSSI, etc. The transmitter 708 may include hardware, firmware, and/or software code executable by a processor for transmitting data, the code comprising instructions and being stored in a memory (e.g., computer-readable medium). A suitable example of the transmitter 708 may including, but is not limited to, an RF transmitter.

Moreover, in an aspect, transmitting device may include the RF front end 788, which may operate in communication with one or more antennas 766 and transceiver 702 for receiving and transmitting radio transmissions, for example, wireless communications transmitted by at least one UE 104. The RF front end 788 may be connected to one or more antennas 766 and may include one or more low-noise amplifiers (LNAs) 790, one or more switches 792, one or more power amplifiers (PAs) 798, and one or more filters 796 for transmitting and receiving RF signals.

In an aspect, the LNA 790 may amplify a received signal at a desired output level. In an aspect, each LNA 790 may have a specified minimum and maximum gain values. In an aspect, the RF front end 788 may use one or more switches 792 to select a particular LNA 790 and its specified gain value based on a desired gain value for a particular application.

Further, for example, one or more PA(s) 798 may be used by the RF front end 788 to amplify a signal for an RF output at a desired output power level. In an aspect, each PA 798 may have specified minimum and maximum gain values. In an aspect, the RF front end 788 may use one or more switches 792 to select a particular PA 798 and its specified gain value based on a desired gain value for a particular application.

Also, for example, one or more filters 796 may be used by the RF front end 588 to filter a received signal to obtain an input RF signal. Similarly, in an aspect, for example, a respective filter 796 may be used to filter an output from a respective PA 798 to produce an output signal for transmission. In an aspect, each filter 796 may be connected to a specific LNA 790 and/or PA 798. In an aspect, the RF front end 788 may use one or more switches 792 to select a transmit or receive path using a specified filter 796, LNA 790, and/or PA 798, based on a configuration as specified by the transceiver 702 and/or processor 712.

As such, the transceiver 702 may be configured to transmit and receive wireless signals through one or more antennas 766 via the RF front end 788. In an aspect, the transceiver 702 may be tuned to operate at specified frequencies such that transmitting device may communicate with, for example, one or more base stations 102 or one or more cells associated with one or more base stations 102. In an aspect, for example, the modem 714 may configure the transceiver 702 to operate at a specified frequency and power level based on the configuration of the transmitting device and the communication protocol used by the modem 714.

In an aspect, the modem 714 may be a multiband-multimode modem, which may process digital data and communicate with the transceiver 702 such that the digital data is sent and received using the transceiver 702. In an aspect, the modem 714 may be multiband and be configured to support multiple frequency bands for a specific communications protocol. In an aspect, the modem 714 may be multimode and be configured to support multiple operating networks and communications protocols. In an aspect, the modem 714 may control one or more components of transmitting device (e.g., RF front end 788, transceiver 702) to enable transmission and/or reception of signals from the network based on a specified modem configuration. In an aspect, the modem configuration may be based on the mode of the modem 714 and the frequency band in use. In another aspect, the modem configuration may be based on UE configuration information associated with transmitting device as provided by the network during cell selection and/or cell reselection.

Figure 8:
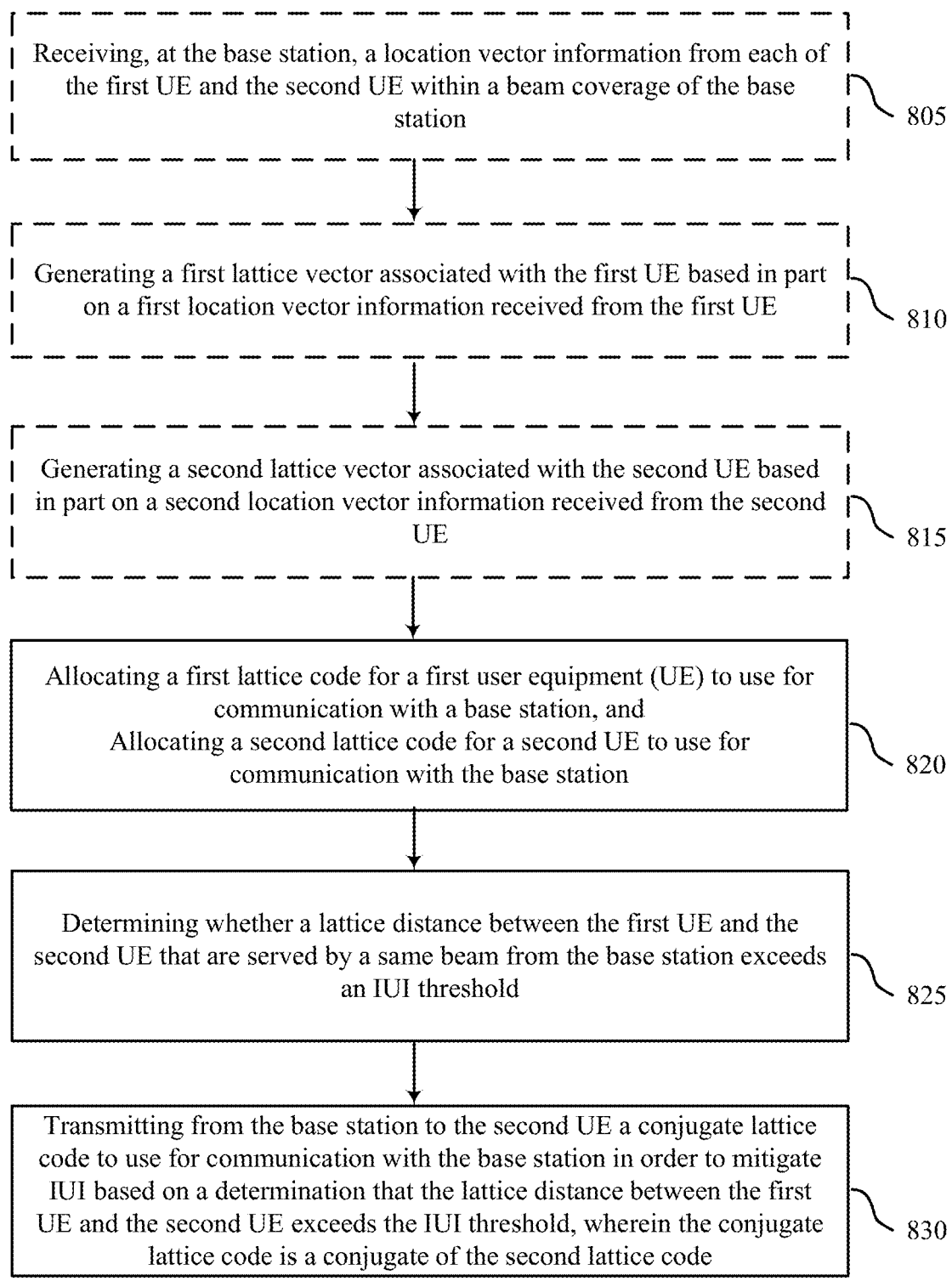
FIG. 8 is flow diagram of an example of a method of wireless communication implemented by the base station in accordance with aspects of the present disclosure.

Referring to FIG. 8, an example method 800 for wireless communications in accordance with aspects of the present disclosure may be performed by the base station 102 discussed with reference to FIGS. 1-4. Although the method 800 is described below with respect to the elements of the base station, other components may be used to implement one or more of the steps described herein.

At block 805, the method 800 may optionally include receiving, at the base station, a location vector information from each of the first UE and the second UE within a beam coverage of the base station. In some examples, the location vector information from the one or more UEs includes may include one or more of propagation delay ($t_p$), angle of elevation ($\theta$), or angle of azimuth ($\varphi$) of the one or more UEs with respect to the base station. Aspects of block 805 may be performed by the transceiver 702 of the base station 102 described with reference to FIG. 7. Thus, the modem 714, processor 712, transceiver 702, and/or the base station 102 or one of its subcomponents may define the means for receiving, at the base station, a location vector information from each of the first UE and the second UE within a beam coverage of the base station.

At block 810, the method 800 may optionally include generating a first lattice vector associated with the first UE based in part on a first location vector information received from the first UE. Aspects of block 810 may be performed by the UE location vector component 755 of the base station 102 described with reference to FIG. 7. Thus, the modem 714, processor 712, UE location vector component 755 and/or the base station 102 or one of its subcomponents may define the means for generating a first lattice vector associated with the first UE based in part on a first location vector information received from the first UE.

At block 815, the method 800 may optionally include generating a second lattice vector associated with the second UE based in part on a second location vector information received from the second UE. The base station 102 may further generate a coding matrix based in part on the first lattice vector associated with the first UE and the second lattice vector associated with the second UE, wherein the coding matrix allocates a unique lattice code for each of the one or more UEs within the coverage area of the base station. Aspects of block 815 may also be performed by the UE location vector component 755 of the base station 102 described with reference to FIG. 7. Thus, the modem 714, processor 712, UE location vector component 755 and/or the base station 102 or one of its subcomponents may define the means for generating a second lattice vector associated with the second UE based in part on a second location vector information received from the second UE.

At block 820, the method 800 may include allocating a first lattice code for a first UE to use for communication with a base station and allocating a second lattice code for a second UE to use for communication with the base station. Aspects of block 820 may be performed by lattice code assignment component 760 of the base station 102 described with reference to FIG. 7. Thus, the modem 714, processor 712, lattice code assignment component 760 and/or the base station 102 or one of its subcomponents may define the means for allocating a first lattice code for a first UE to use for communication with a base station and allocating a second lattice code for a second UE to use for communication with the base station.

At block 825, the method 800 may include determining whether a lattice distance between the first UE and the second UE that are served by a same beam from the base station exceeds an IUI threshold. In some examples, determining the lattice distance between the first UE and the second UE may comprise determining whether a VNR (or NVNR) of a vertex point exceeds a VNR threshold (or NVNR threshold), and assigning conjugate of Voronoi codebook to the second UE based on the determining that the VNR exceeds the VNR threshold. In some aspects, the UE (e.g., second UE) may detect that the VNR of the vertex point exceeds the VNR threshold, and transmitting a conjugate hopping request to the base station. In turn, the base station may transmit a conjugate lattice code (as illustrated in block 830) to the second UE. Aspects of block 825 may be performed by lattice distance evaluation component 765 of the base station 102 described with reference to FIG. 7. Thus, the modem 714, processor 712, lattice distance evaluation component 765 and/or the base station 102 or one of its subcomponents may define the means for determining whether a lattice distance between the first UE and the second UE that are served by a same beam from the base station exceeds an IUI threshold.

At block 830, the method may include transmitting from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code. Aspects of block 730 may be performed by lattice distance evaluation component 765, the IUI management component 750, and the transceiver 702 of the base station 102 described with reference to FIG. 7. Thus, the modem 714, processor 712, lattice distance evaluation component 765, the IUI management component 750, the transceiver 702 and/or the base station 102 or one of its subcomponents may define the means for transmitting from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Some Further Example Clauses

Implementation examples are described in the followed numbered clauses:

1. A method for mitigating inter-user interference (IUI) in wireless communications, comprising:
allocating a first lattice code for a first user equipment (UE) to use for communication with a base station;
allocating a second lattice code for a second UE to use for communication with the base station;
determining whether a lattice distance between the first UE and the second UE that are served by a same beam from the base station exceeds an IUI threshold; and
transmitting from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

2. The method of clause 1, wherein determining the lattice distance between the first UE and the second UE, comprises:
determining whether a volume noise ratio (VNR) of a vertex point exceeds a VNR threshold; and
assigning conjugate of Voronoi codebook to the second UE based on the determining that the VNR exceeds the VNR threshold.

3. The method of clause 1 or 2, further comprising:
initiating a handover or beam switch of the second UE to the conjugate of Voronoi codebook based on detecting that the VNR of the vertex point exceeds the VNR threshold.

4. The method of any of the clauses 1-3, wherein determining whether the VNR of the vertex point exceeds the VNR threshold, comprises:
detecting, at the second UE that the VNR of the vertex point exceeds the VNR threshold; and
transmitting a conjugate hopping request to the base station.

5. The method of any of the clauses 1-4, wherein the conjugate hopping request includes requesting a lattice distance evaluation from the base station such that the base station determines whether to conduct a handover or beam switch of the second UE to a conjugate of Voronoi codebook.

6. The method of any of the clauses 1-5, further comprising:

receiving, at the base station, a location vector information from each of the first UE and the second UE within a beam coverage of the base station;

generating a first lattice vector associated with the first UE based in part on a first location vector information received from the first UE; and generating a second lattice vector associated with the second UE based in part on a second location vector information received from the second UE.

7. The method of any of the clauses 1-6, further comprising:

generating a coding matrix based in part on the first lattice vector associated with the first UE and the second lattice vector associated with the second UE, wherein the coding matrix allocates a unique lattice code for each of one or more UEs within coverage area of the base station.

8. The method of any of the clauses 1-7, wherein the location vector information from one or more UEs includes one or more of propagation delay ($t_p$), angle of elevation ($\theta$), or angle of azimuth ($\varphi$) of the one or more UEs with respect to the base station.

9. An apparatus for mitigating inter-user interference (IUI) in wireless communications, comprising:

a memory configured to store instructions; and a processor communicatively coupled with the memory, the processor configured to execute the instructions to:

allocate a first lattice code for a first user equipment (UE) to use for communication with a base station;

allocate a second lattice code for a second UE to use for communication with the base station;

determine whether a lattice distance between the first UE and the second UE that are served by a same beam from the base station exceeds an IUI threshold; and transmit from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

10. The apparatus of clause 9, wherein the processor configured to execute the instructions to determine the lattice distance between the first UE and the second UE is further configured to execute instructions to:

determine whether a volume noise ratio (VNR) of a vertex point exceeds a VNR threshold; and assign conjugate of Voronoi codebook to the second UE based on the determining that the VNR exceeds the VNR threshold.

11. The apparatus of clause 9 or 10, wherein the processor is further configured to execute the instructions to:

initiate a handover or beam switch of the second UE to the conjugate of Voronoi codebook based on detecting that the VNR of the vertex point exceeds the VNR threshold.

12. The apparatus of any of the clauses 9-11, wherein the processor configured to execute the instructions to determine whether the VNR of the vertex point exceeds the VNR threshold is further configured to execute instructions to:

detect, at the second UE that the VNR of the vertex point exceeds the VNR threshold; and transmit a conjugate hopping request to the base station.

13. The apparatus of any of the clauses 9-12, wherein the conjugate hopping request includes requesting a lattice distance evaluation from the base station such that the base station determines whether to conduct a handover or beam switch of the second UE to a conjugate of Voronoi codebook.

14. The apparatus of any of the clauses 9-13, wherein the processor is further configured to execute the instructions to:

receive, at the base station, a location vector information from each of the first UE and the second UE within a beam coverage of the base station;

generate a first lattice vector associated with the first UE based in part on a first location vector information received from the first UE; and generate a second lattice vector associated with the second UE based in part on a second location vector information received from the second UE.

15. The apparatus of any of the clauses 9-14, wherein the processor is further configured to execute the instructions to:

generate a coding matrix based in part on the first lattice vector associated with the first UE and the second lattice vector associated with the second UE, wherein the coding matrix allocates a unique lattice code for each of one or more UEs within coverage area of the base station.

16. The apparatus of any of the clauses 9-15, wherein the location vector information from the one or more UEs includes one or more of propagation delay ($t_p$), angle of elevation ($\theta$), or angle of azimuth ($\varphi$) of one or more UEs with respect to the base station.

17. A non-transitory computer readable medium storing instructions, executable by a processor, for mitigating inter-user interference (IUI) in wireless communications, comprising instructions for:

allocating a first lattice code for a first user equipment (UE) to use for communication with a base station;

allocating a second lattice code for a second UE to use for communication with the base station;

determining whether a lattice distance between the first UE and the second UE that are served by a same beam from the base station exceeds an IUI threshold; and transmitting from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

18. The non-transitory computer readable medium of clause 17, wherein the processor that includes instructions for determining the lattice distance between the first UE and the second UE further includes instructions for:

determining whether a volume noise ratio (VNR) of a vertex point exceeds a VNR threshold; and assigning conjugate of Voronoi codebook to the second UE based on the determining that the VNR exceeds the VNR threshold.

19. The non-transitory computer readable medium of clause 17 or 18, wherein the processor further includes instructions for:

initiating a handover or beam switch of the second UE to the conjugate of Voronoi codebook based on detecting that the VNR of the vertex point exceeds the VNR threshold.

20. The non-transitory computer readable medium of any of clauses 17-19, wherein the processor that includes instructions for determining whether the VNR of the vertex point exceeds the VNR threshold further includes instructions for:

detecting, at the second UE that the VNR of the vertex point exceeds the VNR threshold; and transmitting a conjugate hopping request to the base station.

21. The non-transitory computer readable medium of any of clauses 17-20, wherein the conjugate hopping request includes requesting a lattice distance evaluation from the base station such that the base station determines whether to conduct a handover or beam switch of the second UE to a conjugate of Voronoi codebook.

22. The non-transitory computer readable medium of any of clauses 17-21, wherein the processor further includes instructions for:

receiving, at the base station, a location vector information from each of the first UE and the second UE within a beam coverage of the base station;

generating a first lattice vector associated with the first UE based in part on a first location vector information received from the first UE; and generating a second lattice vector associated with the second UE based in part on a second location vector information received from the second UE.

23. The non-transitory computer readable medium of any of clauses 17-22, wherein the processor further includes instructions for:

generating a coding matrix based in part on the first lattice vector associated with the first UE and the second lattice vector associated with the second UE, wherein the coding matrix allocates a unique lattice code for each of one or more UEs within coverage area of the base station.

24. The non-transitory computer readable medium of any of clauses 17-23, wherein the location vector information from the one or more UEs includes one or more of propagation delay ($t_p$), angle of elevation ($\theta$), or angle of azimuth ($\varphi$) of one or more UEs with respect to the base station.

25. An apparatus for mitigating inter-user interference (IUI) in wireless communications, comprising:

means for allocating a first lattice code for a first user equipment (UE) to use for communication with a base station;

means for allocating a second lattice code for a second UE to use for communication with the base station;

means for determining whether a lattice distance between the first UE and the second UE that are served by a same beam from the base station exceeds an IUI threshold; and means for transmitting from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

26. The apparatus of clause 25, wherein the means determining the lattice distance between the first UE and the second UE further comprise:

means for determining whether a volume noise ratio (VNR) of a vertex point exceeds a VNR threshold; and means for assigning conjugate of Voronoi codebook to the second UE based on the determining that the VNR exceeds the VNR threshold.

27. The apparatus of clauses 25 or 26, further comprising: means for initiating a handover or beam switch of the second UE to the conjugate of Voronoi codebook based on detecting that the VNR of the vertex point exceeds the VNR threshold.

28. The apparatus of any of clauses 25-27, wherein the means for determining whether the VNR of the vertex point exceeds the VNR threshold further comprise:

means for detecting, at the second UE that the VNR of the vertex point exceeds the VNR threshold; and means for transmitting a conjugate hopping request to the base station.

29. The apparatus of any of clauses 25-28, wherein the conjugate hopping request includes requesting a lattice distance evaluation from the base station such that the base station determines whether to conduct a handover or beam switch of the second UE to a conjugate of Voronoi codebook.

30. The apparatus of any of clauses 25-29, further comprising:

means for receiving, at the base station, a location vector information from each of the first UE and the second UE within a beam coverage of the base station;

means for generating a first lattice vector associated with the first UE based in part on a first location vector information received from the first UE; and means for generating a second lattice vector associated with the second UE based in part on a second location vector information received from the second UE.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for mitigating inter-user interference (IUI) in wireless communications, comprising:
    receiving, at a base station, location vector information from each of a first user equipment (UE) and a second UE;
    allocating a first lattice code for the first UE to use for communication with the base station with the first lattice code being based in part on the location vector information from the first UE;
allocating a second lattice code for the second UE to use for communication with the base station with the second lattice code being based in part on the location vector information from the second UE;
determining whether a lattice distance between the first UE and the second UE that are served by a same beam from the base station exceeds an IUI threshold; and
transmitting from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

2. The method of claim 1, wherein determining the lattice distance between the first UE and the second UE, comprises:
determining whether a volume noise ratio (VNR) of a vertex point exceeds a VNR threshold; and
assigning conjugate of Voronoi codebook to the second UE based on the determining that the VNR exceeds the VNR threshold.

3. The method of claim 2, further comprising:
initiating a handover or beam switch of the second UE to the conjugate of Voronoi codebook based on detecting that the VNR of the vertex point exceeds the VNR threshold.

4. The method of claim 2, wherein determining whether the VNR of the vertex point exceeds the VNR threshold, comprises:
detecting, at the second UE that the VNR of the vertex point exceeds the VNR threshold; and
transmitting a conjugate hopping request to the base station.

5. The method of claim 4, wherein the conjugate hopping request includes requesting a lattice distance evaluation from the base station, and the method further comprising determining, at the base station, whether to conduct a handover or beam switch of the second UE to a conjugate of Voronoi codebook.

6. The method of claim 1, further comprising:
generating a first lattice vector associated with the first UE based in part on a first location vector information received from the first UE; and
generating a second lattice vector associated with the second UE based in part on a second location vector information received from the second UE.

7. The method of claim 6, further comprising:
generating a coding matrix based in part on the first lattice vector associated with the first UE and the second lattice vector associated with the second UE, wherein the coding matrix allocates a unique lattice code for each of one or more UEs within coverage area of the base station.

8. The method of claim 6, wherein the location vector information from one or more UEs includes one or more of propagation delay ($t_p$), angle of elevation ($\theta$), or angle of azimuth ($\varphi$) of the one or more UEs with respect to the base station.

9. An apparatus for mitigating inter-user interference (IUI) in wireless communications, comprising:
a memory configured to store instructions; and
a processor communicatively coupled with the memory, the processor configured to execute the instructions to:
receive, at a base station, location vector information from each of a first user equipment (UE) and a second UE;
allocate a first lattice code for the first UE to use for communication with the base station with the first lattice code being based in part on the location vector information from the first UE;
allocate a second lattice code for the second UE to use for communication with the base station with the second lattice code being based in part on the location vector information from the second UE;
determine whether a lattice distance between the first UE and the second UE that are served by a same beam from the base station exceeds an IUI threshold; and
transmit from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

10. The apparatus of claim 9, wherein the processor configured to execute the instructions to determine the lattice distance between the first UE and the second UE is further configured to execute instructions to:
determine whether a volume noise ratio (VNR) of a vertex point exceeds a VNR threshold; and
assign conjugate of Voronoi codebook to the second UE based on the determining that the VNR exceeds the VNR threshold.

11. The apparatus of claim 10, wherein the processor is further configured to execute the instructions to:
initiate a handover or beam switch of the second UE to the conjugate of Voronoi codebook based on detecting that the VNR of the vertex point exceeds the VNR threshold.

12. The apparatus of claim 10, wherein the processor configured to execute the instructions to determine whether the VNR of the vertex point exceeds the VNR threshold is further configured to execute instructions to:
detect, at the second UE that the VNR of the vertex point exceeds the VNR threshold; and
transmit a conjugate hopping request to the base station.

13. The apparatus of claim 12, wherein the conjugate hopping request includes requesting a lattice distance evaluation from the base station, and the processor is further configured to execute the instructions to determine whether to conduct a handover or beam switch of the second UE to a conjugate of Voronoi codebook.

14. The apparatus of claim 9, wherein the processor is further configured to execute the instructions to:
generate a first lattice vector associated with the first UE based in part on a first location vector information received from the first UE; and
generate a second lattice vector associated with the second UE based in part on a second location vector information received from the second UE.

15. The apparatus of claim 14, wherein the processor is further configured to execute the instructions to:
generate a coding matrix based in part on the first lattice vector associated with the first UE and the second lattice vector associated with the second UE, wherein the coding matrix allocates a unique lattice code for each of one or more UEs within coverage area of the base station.

16. The apparatus of claim 14, wherein the location vector information includes one or more of propagation delay ($t_p$), angle of elevation ($\theta$), or angle of azimuth ($\varphi$) of the UEs with respect to the base station.

17. A non-transitory computer readable medium storing instructions that when executed by a processor of a base station, mitigate inter-user interference (IUI) in wireless communications, comprising instructions for:
receiving location vector information from each of a first user equipment (UE) and a second UE;
allocating a first lattice code for the first UE to use for communication with the base station with the first lattice code based in part on the location vector information from the first UE;
allocating a second lattice code for the second UE to use for communication with the base station with the second lattice code based in part on the location vector information from the second UE;
determining whether a lattice distance between the first UE and the second UE that are served by a same beam from the base station exceeds an IUI threshold; and
transmitting from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

18. The non-transitory computer readable medium of claim 17, wherein the instructions for determining the lattice distance between the first UE and the second UE further include instructions for:
determining whether a volume noise ratio (VNR) of a vertex point exceeds a VNR threshold; and
assigning conjugate of Voronoi codebook to the second UE based on the determining that the VNR exceeds the VNR threshold.

19. The non-transitory computer readable medium of claim 18, wherein the instructions further include instructions for:
initiating a handover or beam switch of the second UE to the conjugate of Voronoi codebook based on detecting that the VNR of the vertex point exceeds the VNR threshold.

20. The non-transitory computer readable medium of claim 18, wherein the instructions for determining whether the VNR of the vertex point exceeds the VNR threshold further include instructions for:
detecting, at the second UE that the VNR of the vertex point exceeds the VNR threshold; and
transmitting a conjugate hopping request to the base station.

21. The non-transitory computer readable medium of claim 20, wherein the conjugate hopping request includes requesting a lattice distance evaluation from the base station and the instructions further include instructions for determining whether to conduct a handover or beam switch of the second UE to a conjugate of Voronoi codebook.

22. The non-transitory computer readable medium of claim 17, wherein the instructions further include instructions for:
generating a first lattice vector associated with the first UE based in part on a first location vector information received from the first UE; and
generating a second lattice vector associated with the second UE based in part on a second location vector information received from the second UE.

23. The non-transitory computer readable medium of claim 22, wherein the instructions further include instructions for:
generating a coding matrix based in part on the first lattice vector associated with the first UE and the second lattice vector associated with the second UE, wherein the coding matrix allocates a unique lattice code for each of one or more UEs within coverage area of the base station.

24. The non-transitory computer readable medium of claim 22, wherein the location vector information includes one or more of propagation delay ($t_p$), angle of elevation ($\theta$), or angle of azimuth ($\varphi$) of the UEs with respect to the base station.

25. An apparatus for mitigating inter-user interference (IUI) in wireless communications, comprising:
means for receiving, at a base station, location vector information from each of a first user equipment (UE) and a second UE;
means for allocating a first lattice code for the first UE to use for communication with the base station with the first lattice code being based in part on the location vector information from the first UE;
means for allocating a second lattice code for the second UE to use for communication with the base station with the second lattice code being based in part on the location vector information from the second UE;
means for determining whether a lattice distance between the first UE and the second UE that are served by a same beam from the base station exceeds an IUI threshold; and
means for transmitting from the base station to the second UE a conjugate lattice code to use for communication with the base station in order to mitigate IUI based on a determination that the lattice distance between the first UE and the second UE exceeds the IUI threshold, wherein the conjugate lattice code is a conjugate of the second lattice code.

26. The apparatus of claim 25, wherein the means determining the lattice distance between the first UE and the second UE further comprise:
means for determining whether a volume noise ratio (VNR) of a vertex point exceeds a VNR threshold; and
means for assigning conjugate of Voronoi codebook to the second UE based on the determining that the VNR exceeds the VNR threshold.

27. The apparatus of claim 26, further comprising:
means for initiating a handover or beam switch of the second UE to the conjugate of Voronoi codebook based on detecting that the VNR of the vertex point exceeds the VNR threshold.

28. The apparatus of claim 26, wherein the means for determining whether the VNR of the vertex point exceeds the VNR threshold further comprise:
means for detecting, at the second UE that the VNR of the vertex point exceeds the VNR threshold; and
means for transmitting a conjugate hopping request to the base station.

29. The apparatus of claim 28, wherein the conjugate hopping request includes requesting a lattice distance evaluation from the base station and means for determining, at the base station, whether to conduct a handover or beam switch of the second UE to a conjugate of Voronoi codebook.

30. The apparatus of claim 25, further comprising:
means for generating a first lattice vector associated with the first UE based in part on a first location vector information received from the first UE; and means for generating a second lattice vector associated with the second UE based in part on a second location vector information received from the second UE.

\* \* \* \* \*